United States Patent Office 2,978,486
Patented Apr. 4, 1961

2,978,486

NITRO DICARBAMATES

Milton B. Frankel, Pasadena, Calif., assignor to Aerojet-General Corporation, Azusa, Calif., a corporation of Ohio No Drawing. Filed Oct. 25, 1954, Ser. No. 464,610

15 Claims. (Cl. 260—482)

This invention relates to new compositions of matter and a method for their preparation. In particular, it relates to nitro dicarbamates having the general formula:

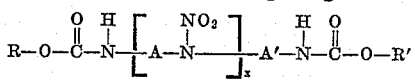

wherein R and R' are the same or different and are nitroalkyl radicals, A and A' are alkylene or nitroalkylene radicals, A' being a nitroalkylene radical when $x$ is 0, and $x$ is a small whole number from 0 to 5 inclusive.

Due to their high oxygen content, these compounds find valuable use as high explosives which are useful as the filling for shells and air-borne demolition bombs. The compounds of this invention are sufficiently insensitive to withstand the shock entailed in the ejection of a shell from a gun barrel under the pressure developed from ignition of a propellant charge, and can be caused to explode on operation of an impact or time fuze mechanism firing a detonator-booster element. They are also useful as additives in conventional propellants to improve the burning properties of such propellants.

The compounds of this invention are prepared by the addition of nitro alcohols to nitro diisocyanates, in accordance with the general reaction scheme set forth below:

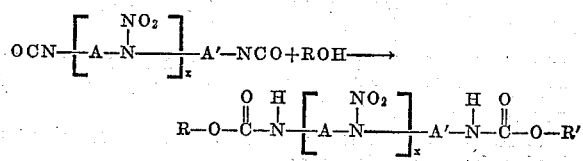

wherein R, R', A, A', and $x$ are as defined above. Nitrocarbamates in which R and R' are different are prepared in a like manner by employing a mixture of nitroalcohols in the above reaction. The nitrocarbamate series wherein $x$ is 0 and A' is an alkylene radical may also be prepared in this manner by adding nitroalcohols with aliphatic isocyanates.

As a matter of convenience, the reaction is preferably conducted in the presence of a free radical-forming catalyst such as ferric acetylacetonate or boron trifluoride.

The nitraza diisocyanates useful as starting materials in the practice of this invention are prepared by reacting a corresponding nitraza acid halide with sodium azide under anhydrous conditions and thereafter heating to effect rearrangement to the desired isocyanate, according to the method disclosed in assignee's copending applications Serial No. 377,686, filed August 31, 1953, now abandoned, and Serial No. 438,294, filed June 21, 1954, now abandoned. The nitro acid halides suitable for this purpose are obtained by reacting the corresponding acids with thionyl halides. The nitro acids are obtained by condensing unsaturated nitriles such as acrylonitrile, with ammonia, amino acids, or amines to produce amino nitriles. The condensation may be repeated to produce amino nitriles having as many as five amino groups in the chain. The amino nitriles are subsequently nitrated with nitric acid, as disclosed in assignee's copending application Serial No. 438,295, filed June 21, 1954, now abandoned and then hydrolyzed with a strong mineral acid to produce nitraza acids, as disclosed in assignee's copending application Serial No. 439,469, filed June 25, 1954, now abandoned. The nitro diisocyanates, used as starting materials, are obtained by reacting nitrodiacyl halides with sodium azide as described above and as disclosed in assignee's copending applications Serial No. 198,493, filed November 30, 1950, now abandoned, and Serial No. 397,017, filed December 8, 1953, now abandoned. The nitrodiacyl halides are prepared by reacting nitrodiacids with thionyl halides. Nitro acids are readily prepared by condensing unsaturated acids such as acrylic acid with nitronate salts of alkanes, as described in J. Org. Chem. (1951), vol. 16, pp. 161–164.

The nitroalcohols used as starting materials are readily obtained by condensing the nitronate salts of alkanes with: formaldehyde, to produce alcohols such as 2,2,2-trinitroethanol and 2,2-dinitropropanol; or with unsaturated acids, such as acrylic acid, to produce nitro acids such as 3,3-dinitrobutanoic acid and 3,3-dinitropentanoic acid, the acid halides of which are reduced by lithium aluminum hydride to nitro alcohols, as disclosed in assignee's copending application Serial No. 383,145, filed September 28, 1953.

To more clearly illustrate my invention, the following examples are presented. It should be understood, however, that these examples are presented merely as a means of illustration and are not intended to limit the scope of the invention in any way.

EXAMPLE I

*Preparation of methylene-bis(2,2,2-trinitroethyl) dicarbamate*

A 4.9 gm. sample (0.05 mole) of methylene diisocyanate, 18.1 gm. (0.1 mole) of 2,2,2-trinitroethanol, 13.2 ml. (0.1 mole) of boron trifluoride·etherate, and 200 ml. of dry, alcohol-free chloroform were placed in a 500 ml. round-bottom flask, fitted with a condenser and drying tube. The solution was refluxed for 20 hours and concentrated in vacuo, leaving a white mushy solid. This product was dissolved in ether and the ether solution was washed with six 100 ml. portions of water to remove the boron trifluoride. The ether solution, which turned yellow during the washings, was dried and concentrated in vacuo to give a yellow, viscous oil. The oil was recrystallized from chloroform to give 5.8 gm. (46.6%) of a yellow crystalline solid, M.P. 115–118° C. (dec.). The solid was dissolved in methylene chloride to give a yellow solution, and charcoal was added; on filtration, a colorless solution was obtained. The solution was recrystallized three times from chloroform to give white needles, M.P. 125–126° C., impact stability =100 cm./2 kg., and dried at 40° C. and 2 mm. for 4 hours. An elemental analysis of the product is as follows:

Calculated for $C_7H_8N_8O_{16}$: Percent C, 18.27; percent H, 1.75; percent N, 24.35. Found: Percent C, 18.40; percent H, 1.64; percent N, 23.73.

EXAMPLE II

*Preparation of 3,3-dinitro-1,5-pentane-bis(2,2,2-trinitroethyl) dicarbamate*

In a one liter round-bottom flask fitted with a condenser and drying tube, was placed 48.8 gm. (0.2 mole) of 3,3-dinitro-1,5-pentane diisocyanate, 72.4 gm. (0.4 mole) of 2,2,2-trinitroethanol, 400 ml. of dry alcohol-free chloroform, and 52 ml. (0.4 mole) of boron trifluoride·etherate. The solution was refluxed for 24 hours, cooled, and washed with 4×250 ml. portions of water.

During the final water washing a cream colored solid separated from the chloroform solution. The product was collected, washed with chloroform, and dried to give 75 gm. (61.8%) of 3,3-dinitro-1,5-pentane-bis(2,2,2-trinitroethyl) carbamate, M.P. 96–97° C., impact stability =35 cm./2 kg.

EXAMPLE III

*Preparation of 3-nitraza-1,5-pentane-bis(2,2,2-trinitroethyl) dicarbamate*

Equivalent quantities of 2,2,2-trinitroethyl alcohol and 3-nitraza-1,5-pentane diisocyanate were refluxed with a catalytic amount of ferric acetylacetonate for eight hours. The solution was then evaporated to dryness in vacuo. The residue was recrystallized from ethylene dichloride in 92.5% yield of 3-nitraza-1,5-pentane-bis(2,2,2-trinitroethyl) carbamate, M.P. 130–131° C. The elemental analysis of the product is as follows:

Calculated for $CH_{10}H_{14}N_{10}O_{15}$: percent C, 21.36; percent H, 2.51; percent N, 24.91. Found: percent C, 21.87; percent H, 2.70; percent N, 25.38.

EXAMPLE IV

*Preparation of 3,3,7,7-tetranitro-5-nitraza-1,9-nonane-bis(2,2,2-trinitroethyl) dicarbamate*

Equivalent quantities of 2,2,2-trinitroethyl alcohol and 3,3,7,7-tetranitro-5-nitraza-1,9-nonane diisocyanate were refluxed with a catalytic amount of ferric acetylacetonate for eight hours. The solution was then evaporated to dryness in vacuo. The residue was recrystallized from a methanol water mixture in a 91.3% yield of 3,3,7,7-tetranitro-5-nitraza-1,9-nonane-bis(2,2,2-trinitroethyl) carbamate. The elemental analysis of the product is as follows:

Calculated for $C_{14}H_{18}N_{14}O_{26}$: percent C, 21.06; percent H, 2.27; percent N, 24.56. Found: percent C, 21.34; percent H, 2.59; percent N, 25.37.

EXAMPLE V

*Preparation of 3,6-dinitraza-1,8-octane-bis(2,2,2-trinitroethyl) dicarbamate*

A mixture of 28.8 gm. (0.1 mole) of 3,6-dinitraza-1,8-octane diisocyanate, 36.2 gm. (0.2 mole) of 2,2,2-trinitroethanol, 175 ml. of ethylene dichloride, and a trace of ferric acetylacetonate was refluxed for six hours. On cooling, 55.7 gm. (85.7%) of a cream colored solid separated, M.P. 156–158° C.

EXAMPLE VI

*Preparation of 2-nitraza-1,4-butane-bis(2,2,2-trinitroethyl) dicarbamate*

In a 250 ml. round-bottom flask, fitted with a reflux condenser and drying tube, was placed 10.0 gm. (0.0538 mole) of 2-nitraza-1,4-butane diisocyanate, 19.5 gm. (0.108 mole) of 2,2,2-trinitroethanol, 100 ml. of dry chloroform, and a trace of ferric acetylacetonate. The solution was refluxed for three hours and, on cooling, an oil layer separated which crystallized. The white solid was collected and dried; the weight was 25.6 gm. (86.7%), and the M.P. 58–61° C. Recrystallization from ethylene dichloride raised the M.P. to 65–67° C. The elemental analysis of the product is as follows:

Calculated for $CH_{12}N_{10}O_{18}$: percent, C, 19.71; percent H, 2.21; percent N, 25.55. Found: percent C, 20.29; percent H, 2.45; percent N, 25.21.

I have also found that alcohols such as 3,3-dinitrobutanol, 2,2-dinitrobutanol and 3,3,3-trinitropropanol also undergo an addition reaction with isocyanates such as 3,3,6,6-tetranitro-1,8-octane diisocyanate and 2,6-dinitraza-4,4-dinitro-1,7-heptane diisocyanate to produce the nitro dicarbamates: 3,3,6,6-tetranitro-1,8-octane-bis(3,3-dinitrobutyl) dicarbamate, 3,3,6,6-tetranitro-1,8-octane-bis(2,2-dinitrobutyl) dicarbamate, 2,6-dinitraza-4,4-dinitro-1,7-heptane-bis (3,3-dinitrobutyl) dicarbamate, 2,6-dinitraza-4,4-dinitro-1,7-heptane-bis(2,2-dinitrobutyl) dicarbamate, 2,6-dinitraza-4,4-dinitro-1,7-heptane-bis-(3,3,3-trinitropropyl) dicarbamate, and 3,3,6,6-tetranitro-1,8-octane-bis(3,3,3-trinitropropyl) dicarbamate. It is apparent that any member of the disclosed series of nitro dicarbamates may be prepared by the condensation of nitraza isocyanates and nitro alcohols, according to the teachings of this invention.

The nitro compounds of this invention are useful as high explosives and can be used in any conventional explosive missile, projectile, rocket, or the like, as the main explosive charge. An example of such a missile is disclosed in United States Patent No. 2,470,162, issued May 17, 1949. One way of using the high explosives of this invention in a device such as that disclosed in United States Patent No. 2,470,162, is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode on operation of an impact- or time fuse-mechanism firing a detonating explosive such as lead azide or mercury fulminate.

I claim:

1. As compositions of matter, nitro dicarbamates having the general formula:

$$R-O-\overset{O}{\overset{\|}{C}}-\overset{H}{\overset{|}{N}}-\left[-A-\overset{NO_2}{\overset{|}{N}}-\right]_x-A'-\overset{H}{\overset{|}{N}}-\overset{O}{\overset{\|}{C}}-OR'$$

wherein R and R′ are lower nitroalkyl radicals, A and A′ are radicals selected from the group consisting of lower alkylene and lower nitroalkylene radicals, x is a small whole number from 0 to 5 inclusive, provided that A′ is a nitroalkylene radical when x is 0.

2. As compositions of matter, nitro dicarbamates having the general formula:

$$R-O-\overset{O}{\overset{\|}{C}}-\overset{H}{\overset{|}{N}}-\left[-A-\overset{NO_2}{\overset{|}{N}}-\right]_x-A'-\overset{H}{\overset{|}{N}}-\overset{O}{\overset{\|}{C}}-OR'$$

wherein R and R′ are lower nitroalkyl radicals, A and A′ are lower nitroalkylene radicals and x is a small whole number from 0 to 5 inclusive.

3. As compositions of matter, nitro dicarbamates having the general formula:

$$R-O-\overset{O}{\overset{\|}{C}}-\overset{H}{\overset{|}{N}}-\left[-A-\overset{NO_2}{\overset{|}{N}}-\right]_x-A'-\overset{H}{\overset{|}{N}}-\overset{O}{\overset{\|}{C}}-OR'$$

wherein R and R′ are lower nitroalkly radicals, A and A′ are radicals selected from the group consisting of lower alkylene and lower nitroalkylene radicals and x is a small whole number from 1 to 5 inclusive.

4. As a composition of matter, 3,3-dinitro-1,5-pentane-bis(2,2,2-trinitroethyl) dicarbamate having the structural formula:

$$NO_2-\underset{NO_2}{\overset{NO_2}{\overset{|}{C}}}-CH_2-O-\overset{O}{\overset{\|}{C}}-\overset{H}{\overset{|}{N}}-CH_2CH_2-\underset{NO_2}{\overset{NO_2}{\overset{|}{C}}}-CH_2CH_2-\overset{H}{\overset{|}{N}}-\overset{O}{\overset{\|}{C}}-O-CH_2-\underset{NO_2}{\overset{NO_2}{\overset{|}{C}}}-NO_2$$

5. As a composition of matter, 3-nitraza-1,5-pentane-bis(2,2,2-trinitroethyl) dicarbamate having the structural formula:

$$NO_2-\underset{NO_2}{\overset{NO_2}{\overset{|}{C}}}-CH_2-O-\overset{O}{\overset{\|}{C}}-\overset{H}{\overset{|}{N}}-CH_2CH_2-\overset{NO_2}{\overset{|}{N}}-CH_2CH_2-\overset{H}{\overset{|}{N}}-\overset{O}{\overset{\|}{C}}-O-CH_2-\overset{NO_2}{\overset{|}{C}}-NO_2$$

6. As a composition of matter, 3,3,7,7-tetranitro-5- nitraza-1,9-nonane-bis(2,2,2 - trinitroethyl) dicarbamate having the structural formula:

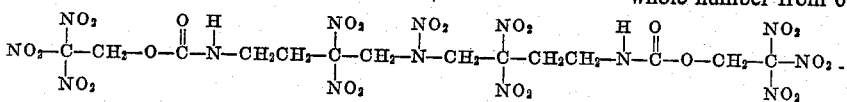

7. As a composition of matter, 3,6-dinitraza-1,8-octane-bis(2,2,2-trinitroethyl) dicarbamate having the structural formula:

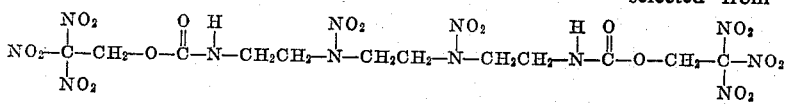

8. As a composition of matter, 2-nitraza-1,4-butane-bis(2,2,2-trinitroethyl) dicarbamate having the structural formula:

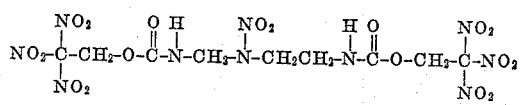

9. The method of preparing nitro-substituted dicarbamates having the general formula:

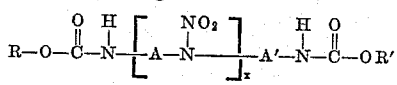

which comprises reacting isocyanates having the general formula:

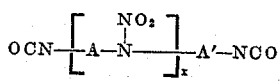

with nitro-substituted alcohols having the general formula:

R—OH wherein R and R' are lower nitroalkyl radicals, A and A' are radicals selected from the group consisting of lower alkylene and lower nitroalkylene radicals and $x$ is a small whole number from 0 to 5 inclusive.

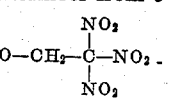

10. The method of claim 9 wherein the reaction is conducted in the presence of a free radical forming catalyst selected from the group consisting of ferric acetyl-

acetonate, boron trifluoride, and mixtures thereof.

11. The method of preparing 3,3-dinitro-1,5-pentane-bis(2,2,2-trinitroethyl) dicarbamate which comprises condensing 3,3-dinitro-1,5-pentane diisocyanate with 2,2,2-trinitroethyl alcohol.

12. The method of preparing 3,3,7,7-tetranitro-5-nitraza-1,9-nonane - bis(2,2,2 - trinitroethyl) dicarbamate which comprises condensing 3,3,7,7-tetranitro-5-nitraza-1,9-nonane diisocyanate with 2,2,2-trinitroethyl alcohol.

13. The method of preparing 3,6-dinitraza-1,8-octane-bis(2,2,2-trinitroethyl) dicarbamate which comprises condensing 3,6-dinitraza-1,8-octane diisocyanate with 2,2,2-trinitroetyhl alcohol.

14. The method of preparing 3-nitraza-1,5-pentane-bis(2,2,2-trinitroethyl) dicarbamate which comprises condensing 3-nitraza-1,5-pentane diisocyanate with 2,2,2-trinitroethyl alcohol.

15. The method of preparing 2-nitraza-1,4-butane-bis (2,2,2-trinitroethyl) dicarbamate which comprises reacting 2,2,2-trinitroethyl alcohol and 2-nitraza-1,4-butane diisocyanate.

References Cited in the file of this patent
FOREIGN PATENTS 138,456     Sweden _____ Dec. 23, 1952